United States Patent [19]

Strickler

[11] Patent Number: 5,074,369
[45] Date of Patent: Dec. 24, 1991

[54] ELECTRONIC WEIGHING APPARATUS HAVING PROTECTIVE COVER MEANS

[75] Inventor: Ernst Strickler, Wolfhausen, Switzerland

[73] Assignee: Mettler-Toledo AG, Greifensee, Switzerland

[21] Appl. No.: 641,713

[22] Filed: Jan. 15, 1991

[30] Foreign Application Priority Data

Mar. 19, 1990 [CH] Switzerland ............................ 875/90

[51] Int. Cl.⁵ .......................................... G01G 21/28
[52] U.S. Cl. .................................... 177/180; 177/124; 177/238; 177/181
[58] Field of Search ............... 177/180, 181, 182, 124, 177/238

[56] References Cited

U.S. PATENT DOCUMENTS

| | | | |
|---|---|---|---|
| 2,732,199 | 1/1956 | Meinig | 177/181 |
| 4,465,152 | 8/1984 | Schmitter | 177/180 |
| 4,762,190 | 8/1988 | Meixner | 177/181 |
| 4,798,250 | 1/1989 | Knothe et al. | 177/181 |
| 4,893,686 | 1/1990 | Chretien et al. | 177/180 |
| 4,979,579 | 12/1990 | Dardat et al. | 177/180 |

FOREIGN PATENT DOCUMENTS 1688583 6/1953 Fed. Rep. of Germany.

Primary Examiner—Benjamin R. Fuller
Assistant Examiner—Randy W. Gibson
Attorney, Agent, or Firm—Laubscher, Presta & Laubscher

[57] ABSTRACT

Electronic weighing apparatus (3) is provided including a transparent cylindrical cover member (13) defining a weighing chamber (1) within which the load weighing pan is contained. The cover member contains an access opening (16) and is rotatable about its axis relative to a concave housing wall portion within which it partially concentrically extends. The cover member is rotatable relative to the housing between closed and open positions in which the access opening is contained within and remote from the concave wall portion, respectively. A radially displaceable member (25) is biased by a spring (29) to close the access opening in a tightly sealed manner when the cylindrical cover member is in the closed position.

10 Claims, 1 Drawing Sheet

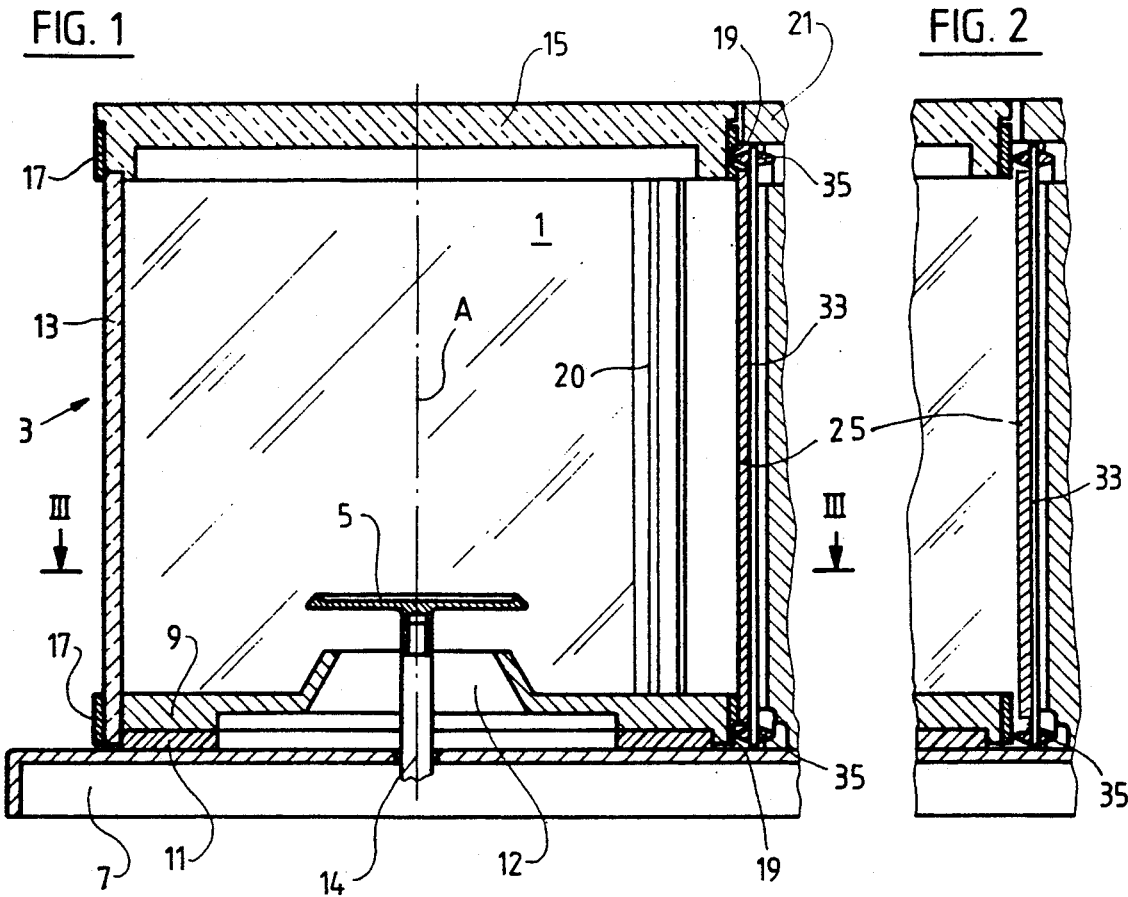
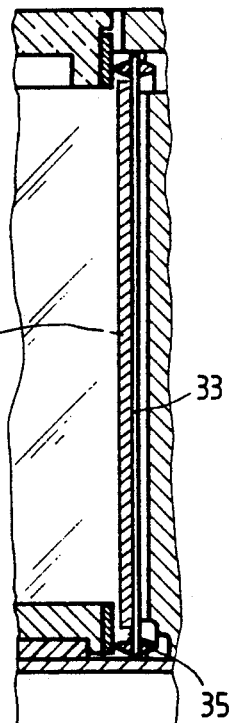
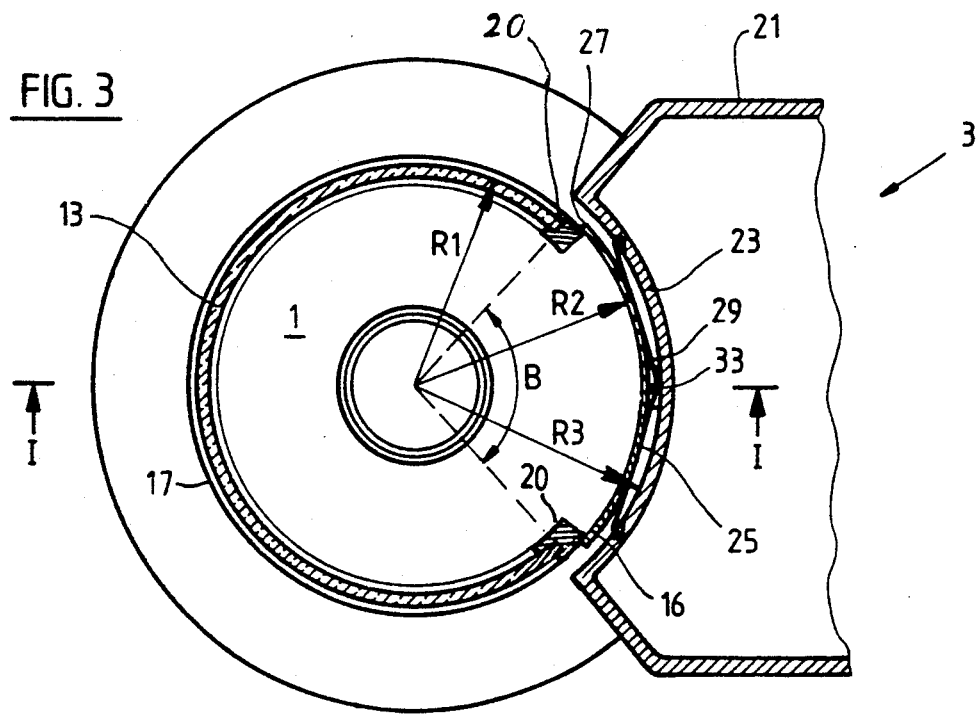

ELECTRONIC WEIGHING APPARATUS HAVING PROTECTIVE COVER MEANS

BRIEF DESCRIPTION OF THE PRIOR ART

This invention relates generally to weighing apparatus including protective cover means for protecting the device against adverse environmental factors that would otherwise adversely affect a weighing measurement.

To this end, the apparatus includes a cylindrical weighing chamber that receives the scale pan and whose wall is formed, on the one hand, by a concavely curved housing wall portion of the scale housing, and, on the other hand, by a segment of a glass cylinder that can be rotated around its axis of rotation, whereby the housing wall and the glass cylinder partly overlap each other when the weighing chamber is closed.

In high-resolution electronic scales (analytical scales, microscales and the like), even minor air movements cause deleterious effects on the weighing result. It is therefore customary to place the weighing pan in a weighing chamber that can be closed off. In addition to rectangular weighing chambers with sliding doors, cylindrical chambers have also become known; they generally consist of a cylinder barrel that is cut open in one sector and that can be rotated around its longitudinal axis. To apply a load to be measured to the weighing pan, the cover is rotated to a position in which easy access to the weighing pan is afforded via an access opening. For the actual weighing operation, the cover is rotated until the cross-section of the opening is covered by a concavely shaped part of the wall of the scale housing.

In the German utility model No. 1,688,583, a scale is disclosed having a cylindrical weighing chamber, a segment of he wall being formed by a curved wall of the scale housing. Between the rotatable part of the weighing chamber wall and the housing, there continue to be gaps through which the air can circulate deleteriously into the weighing chamber.

As known from German Patent No. 800,997, a scale is disclosed having shiftable weighing chamber walls that are curved along a circular track, a loop-like-folded material or rubber strip being attached to one of the edges that are caused to overlap; when the weighing chamber is closed, this strip is intended to prevent the entry or passage of air through the two wall segments that overlap each other only slightly. This kind of seal can prevent the entry of air and thus the generation of air movements inside the weighing chamber. When the scale is used in laboratories or production rooms, however, the sealing strips become contaminated after a short time; as a result, these strips either stick to the wall parts, or they become hard and brittle. Furthermore, a dirty seal always causes contamination of the wall elements of the weighing chamber, which mostly consist of glass or some other transparent material.

SUMMARY OF THE INVENTION

Accordingly, a primary object of the present invention is to provide a sealed cover for electronic weighing apparatus that will not be undesirably influenced by environment factors, such as dirt, moisture, wind currents, or the like.

A further object of the invention is to provide weighing apparatus including a rotatably mounted transparent cylindrical cover member that at least partially encloses the scale weighing pan, which cover contains a lateral access opening and is rotatable relative to a concave wall portion of the scale housing between open and closed positions in which the opening is contained within and remote from the concavity defined by the concave wall portion, respectively. A closure member is mounted for radial displacement between sealed and released positions relative to said opening, respectively, when the cylindrical cover member is in the closed position.

The closure member, which is displaced radially against the opening of the weighing chamber wall, causes a tight sealing of the weighing chamber without the use of compressible sealing means. Because the contact of the radially movable closure wall with the cylindrical wall of the weighing chamber takes place only shortly before the rotatable weighing chamber wall comes to a standstill, there can no longer be any traces of dragging on it during opening and closing, and one can prevent liquid or solid contamination, possibly present on the weighing chamber wall, from being distributed over the wall while it is being rotated which otherwise might impair the clear view into the weighing chamber.

Another advantage of the invention resides in the fact that the rotation of the weighing chamber wall is not hindered by the friction of the seal and that, if electrical drive means are provided, it can be made with considerably lower power requirement with attendant reduction in heat release.

According to a more specific object of the invention, spring means are provided for biasing the closure member toward the sealed position relative to the opening in the cylindrical cover member, and detent means serve to retain the cover member in the closed position relative to the concave wall portion of the scale housing.

BRIEF DESCRIPTION OF THE DRAWING

Other objects and advantages of the invention will become apparent from a study of the following specification, when viewed in the light of the accompanying drawing, in which:

FIG. 1 is a detailed longitudinal view of the electronic weighing apparatus illustrating the protective cover means of the present invention when in the closed position;

FIG. 2 is a detailed view illustrating the position of the closure member when the cover member is rotated to the open position; and FIG. 3 is a sectional view taken along line III—III of FIG. 1.

DETAILED DESCRIPTION

Referring first more particularly to FIG. 1, the electronic weighing apparatus of the present invention includes a housing 21 having a base portion 7 containing an opening through which extends the vertically displaceable load support member 14 which supports at its upper end a weighing pan 5. In accordance with the present invention, the weighing pan 5 is contained in a weighing chamber 1 defined by cover means 3 that are mounted for rotation about the vertical axis A which extends through the load support member 14. The cover means 3 includes a cylindrical cover member 13 formed of a transparent material, such as glass, the upper end of the cover member 13 being closed by a top cover member 15. At its lower end, the cylindrical transparent wall member 13 is connected with a bottom wall 9 which is rotatably supported by an annular support member 11 mounted on the upper end of the base portion 7, the support member 11 being formed of a material having a low coefficient of friction, such as a suitable synthetic plastic material. The rotatable bottom member 9 contains a central opening 12 through which the load support member extends.

The cylindrical transparent member 13 is provided with a lateral access opening defined by the sector B shown in FIG. 3, which sector defines an angle of about 90 degrees. Mounted on each vertical edge of the access opening is a vertical profile rail 20 as shown in FIGS. 1 and 3. Extending concentrically about the lower and upper ends of the cylindrical transparent wall 13 are annular guide rings 17, respectively. As will be explained in greater detail below, these annular rings 17 contain vertically aligned notches 19 (FIG. 1) that form part of detent means for maintaining the cover means 3 in a closed position relative to the housing 7. The outer surfaces of the profile rails 20 lie flush with respect to the outer circumferences of the guide rings 7. Arranged for engagement with the outer surfaces of the guide rings 17 and the profile rails 20 is a curved resilient radially-displaceable closure wall 25 which is operable to close the access opening when the cover member is in the closed position of FIGS. 1 and 3. The housing 21 further includes a vertical concave wall portion 23 (FIG. 3) that partially receives the cylindrical cover member 13, together with a resiliently mounted closure member 25. The concave wall portion 23 is concentric with the cylindrical wall 13, the radius of curvature R3 of the concave wall 23 being greater than the radius of curvature R1 of the cylindrical wall. Spring means 29 are provided between the closure member 25 and the concave housing wall portion 23 for biasing the resiliently mounted closure member toward the closed sealed condition of FIG. 3. The radius of curvature R2 of the closure member is less than the radius R1 of the cylindrical wall 13, thereby causing the spring-biased closure wall to deform slightly into tight sealing engagement with the outer surfaces of the rails 20, and the outer surfaces of the upper and lower annular rings 17. In order to increase the resiliency of the closure wall 25, the vertical edges 27 thereof may be stepped, so that the edge portions of the closure walls 25 are more elastic than the center portion.

In accordance with a characterizing feature of the invention, detent means are provided for retaining the cover means 3 in the closed position illustrated in FIGS. 1 and 3. To this end, a vertical shaft 33 is secured to the center portion of the closure wall 25, the upper and lower ends of the shaft 33 being provided with rollers 35 that cooperate with the aforementioned detent recesses 19 defined within the outer surfaces of the upper and lower annular rings 17. Alternatively, the shaft 33 could be embedded in the wall 25, and instead of having the wall 25 being shiftable, the housing wall 23 could be mounted for lateral displacement relative to the housing 21 radially of the cylindrical wall 13.

Assume that a load to be measured has been applied to the weighing pan 5, and the cover means 3 is in the closed position illustrated in FIGS. 1 to 3. In order to remove the load from the weighing pan 5, the cover means 3 is rotated—either manually or by suitable electric motor drive means —from the closed position toward an angularly displaced position in which the access opening is remote from the chamber defined within the concave wall portion 23. As the cover means 3 is rotated from its closed position of FIGS. 1 to 3, the closure member 25—which is retained against rotation relative to the housing 21—is displaced radially outwardly as the rollers 35 connected with the upper and lower ends of shaft 33 are cammed out from the notches 19, thereby displacing the closure wall 25 to an open radially-spaced position relative to the access opening defined within the cylindrical wall 13. Consequently, during further rotation of the cover means 3 toward the open position, the closure wall 25 does not interfere with the rotational movement of the cover means relative to the housing. The material to be weighed is removed from the weighing pan 5, a new load to be weighed is applied to the weighing pan 5, and the cover means is rotated again toward the closed position of FIGS. 1 and 3. When the rollers 35 again engage the notches 19 formed in the upper and lower annular rings 17, the closure member 25 is biased radially inwardly by spring means 25 toward the closed sealed position relative to the access opening. The vertical edges of the closure wall 25 are biased against the vertical rails 20, and the upper and lower edges of the closure wall 25 engage the outer surfaces of the ring 17. As a result of the slightly smaller diameter R2 of the inside curvature of wall 25 as compared to the outside radius R1 of the rings 17, the closure member 25 rests completely on profile rails 20 and rings 17. In this position, no air or other deleterious material can enter the weighing chamber 1, which would adversely effect the weighing operation.

While the preferred form and embodiment of the invention has been illustrated and described, it will be apparent to those skilled in the art that various modifications may be made without deviating from the inventive concepts set forth above.

What is claimed is:

1. Electronic weighing apparatus, comprising:
  (a) a housing including a base (7);
  (b) a weighing pan (5) connected for vertical movement relative to said base; and
  (c) a protective cover arrangement (3) at least partially enclosing said weighing pan, including:
    (1) a vertical cylindrical transparent cover member (13) connected with said housing for coaxial rotation in concentrically spaced relation about said weighing pan;
    (2) a top member (15) cooperating with an upper end of said cover member to define a weighing chamber (1) within which said weighing pan is contained;
    (3) said housing also including a vertical concave wall (23) extending concentrically about and receiving a portion of said cylindrical cover member;
    (4) said cylindrical cover member containing a lateral opening affording access to said weighing chamber, said cover member being rotatable between a closed position in which said lateral access opening is contained within said concave wall, and an open position in which said access opening is displaced from said concave wall; and
  (b) closure means displaceable radially of said cylindrical cover member for closing said access opening when said cover member is in said closed position.

2. Apparatus as defined in claim 1, wherein said closure means includes a concave closure member (25)

mounted concentrically between said concave housing wall and said cylindrical cover member for radial displacement relative to said cylindrical cover member.

3. Apparatus as defined in claim 2, wherein said closure member (25) is resilient and has a radius (R2) that is slightly smaller than a radius (R1) of said cylindrical cover member (13).

4. Apparatus as defined in claim 2, and further including spring means (29) arranged between said closure member and said concave housing wall portion for biasing said closure member in sealed relation against said cylindrical cover member.

5. Apparatus as defined in claim 4, and further including detent means (35,19) for retaining said cover member in the closed position relative to said housing.

6. Apparatus as defined in claim 5, wherein said detent means includes at least one annular member (17) mounted concentrically on one end of said cover member, and a roller (35) mounted between each said annular member and said concave wall portion, said roller being biased toward said annular member for engagement with a notch (19) formed therein when said cover member is in the closed position relative to said concave housing wall.

7. Apparatus as defined in claim 6, wherein cooperating annular rings (17) and rollers (35) are provided at each end of said cover member.

8. Apparatus as defined in claim 7, wherein said detent means includes also a vertical shaft (33) connected with the surface of said closure member opposite said concave wall portion, said rollers being carried by opposite ends of said vertical shaft, respectively.

9. Apparatus as defined in claim 7, wherein said cover member includes a bottom wall (9), and further wherein said housing includes an annular support member formed of a material having a low coefficient of friction, said support member being mounted on said base for engagement by said bottom wall, thereby to rotatably support said cover member.

10. Apparatus as defined in claim 1, wherein said access opening is defined by a section (b) of said cylindrical cover member having an angle of about 90°.

* * * * *